(12) United States Patent
Ying et al.

(10) Patent No.: US 9,397,752 B2
(45) Date of Patent: Jul. 19, 2016

(54) OPTICAL TRANSCEIVER MODULES, OPTICAL TRANSMISSION DEVICES, AND OPTICAL TRANSMISSION METHODS

(71) Applicant: VIA TECHNOLOGIES, INC., New Taipei (TW)

(72) Inventors: Cheng-Ming Ying, New Taipei (TW); Woei-Harng Lin, New Taipei (TW); Yu-Lung Lin, New Taipei (TW); Wei-Yu Wang, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 173 days.

(21) Appl. No.: 14/450,417

(22) Filed: Aug. 4, 2014

(65) Prior Publication Data

US 2015/0043922 A1  Feb. 12, 2015

Related U.S. Application Data

(60) Provisional application No. 61/863,122, filed on Aug. 7, 2013.

(30) Foreign Application Priority Data

Apr. 24, 2014  (TW) .............................. 103114797 A (51) Int. Cl.
*H04B 10/00* (2013.01)
*H04B 10/2575* (2013.01)
(Continued)

(52) U.S. Cl.
CPC ............ *H04B 10/2575* (2013.01); *H04B 10/40* (2013.01)

(58) Field of Classification Search
CPC .............................. H04B 10/40; H04B 10/278
USPC .................................................... 398/135–139
See application file for complete search history.

(56) References Cited

U.S. PATENT DOCUMENTS

| | | | |
|---|---|---|---|
| 7,324,757 B2 | 1/2008 | Wilson et al. | |
| 7,907,843 B2 | 3/2011 | Yamaji et al. | |
| 8,521,031 B2 | 8/2013 | Tang et al. | |

(Continued)

FOREIGN PATENT DOCUMENTS

| | | |
|---|---|---|
| CN | 101174906 | 5/2008 |
| CN | 101887151 | 11/2010 |

(Continued)

*Primary Examiner* — Daniel Dobson
(74) *Attorney, Agent, or Firm* — McClure, Qualey & Rodack, LLP (57) ABSTRACT

An optical transceiver module coupled to a device is provided. The optical transceiver module includes an electronic signal transmitting terminal coupled to a receiving terminal of the device, an electronic signal receiving terminal coupled to a transmitting terminal of the device, an optical signal receiving terminal coupled to the electronic signal transmitting terminal, and an optical signal transmitting terminal coupled to the electronic signal receiving terminal. When the optical transceiver module is at an normal operation state and the electronic signal receiving terminal does not receive any electronic signal over a first predetermined time period, the optical transceiver module enters a idle detection state to make the electronic signal transmitting terminal to perform a receiver termination detection to the device to determine whether the device is coupled to the optical transceiver module. At the idle detection state, the optical signal transmitting terminal transmits the optical signal continuously.

22 Claims, 4 Drawing Sheets (51) Int. Cl.
   *H04B 10/40*   (2013.01)
   *H04J 14/00*   (2006.01)

(56) References Cited

U.S. PATENT DOCUMENTS

| | | | |
|---|---|---|---|
| 8,594,134 B2 | 11/2013 | Zampetti et al. | |
| 8,824,838 B2 | 9/2014 | Walker | |
| 9,130,677 B2 | 9/2015 | Mukai et al. | |
| 2011/0255873 A1* | 10/2011 | Tang | H04B 10/40 |
| | | | 398/136 |
| 2012/0141132 A1* | 6/2012 | Walker | G06F 13/4086 |
| | | | 398/116 |
| 2013/0129359 A1* | 5/2013 | Zbinden | H04B 10/2503 |
| | | | 398/135 |

FOREIGN PATENT DOCUMENTS

| | | |
|---|---|---|
| CN | 102271019 | 12/2011 |
| CN | 103064155 | 4/2013 |
| TW | 201141092 | 11/2011 |
| TW | 201220733 | 5/2012 |
| TW | 201236394 | 9/2012 |

\* cited by examiner

OPTICAL TRANSCEIVER MODULES, OPTICAL TRANSMISSION DEVICES, AND OPTICAL TRANSMISSION METHODS

CROSS REFERENCE TO RELATED APPLICATIONS

This application claims the benefit of U.S. Provisional Application No. 61/863,122, filed on Aug. 7, 2013, the contents of which are incorporated herein by reference.

This Application claims priority of Taiwan Patent Application No. 103114797, filed on Apr. 24, 2014, the entirety of which is incorporated by reference herein.

BACKGROUND OF THE INVENTION

1. Field of the Invention

The invention relates to an optical transmission device, and more particularly to an optical transmission device applied for universal serial buses (USBs).

2. Description of the Related Art

With development of optical transmission techniques, optical-fiber transmission has advantage of transmission speed, transmission distance, and capability of resisting interference. This, optical transmission devices are widely applied for various application. Since the advantage of the optical transmission technique, more and more applications tend to couple hosts and devices through optical transmission devices, such that the hosts and devices with the conventional interface specifications, such as interface specifications of peripheral component interconnect express (PCIE) or universal serial bus (USB) 3.0, are capable of performing optical fiber communication through the optical transmission devices. In an optical transmission device, active optical cables (AOCs) are disposed on two electrical-to-optical/optical-to-electronic (EO/OE) transformation processing chips at the host-end and the device-end. Through the AOC, the host and the device can performs optical fiber communication without changing of hardware. However, there are some problems in current AOCs. A host and a device supporting USB standard are given as an example. When the host is coupled to a current AOC and the device is not coupled to the current AOC, the host believes that there is a device is inserted and issues a link training sequence for building a link with the device since the AOC has been coupled to the host. At this time, since the device does not coupled to the AOC in practice, the device does not response to the link training sequence. Thus, the host does not receive any response, such that the host enters an invalid mode. In order to lift the invalid mode, the user usually has to perform complicated setting or make the host to re-perform the boot procedure, which causes the user inconvenient usage. Moreover, even if the link between the host and the device is built through the AOC successfully, when one of them is detached from the AOC, the other one cannot detect this detachment event, and the state machine of the other one may operate at an inappropriate state.

BRIEF SUMMARY OF THE INVENTION

Thus, embodiments of the invention provide an AOC and optical transmission method to solve the above problems of the current techniques.

An exemplary embodiment of an optical transceiver module is provided. The optical transceiver module is coupled to a device. The optical transceiver module comprises an electronic signal transmitting terminal, an electronic signal receiving terminal, an optical signal receiving terminal, and an optical signal transmitting terminal. The electronic signal transmitting terminal is coupled to a receiving terminal of the device. The electronic signal receiving terminal is coupled to a transmitting terminal of the device. The optical signal receiving terminal is coupled to the electronic signal transmitting terminal. The optical signal transmitting terminal is coupled to the electronic signal receiving terminal. When the optical transceiver module is at a normal operation state, the optical signal transmitting terminal transmits an optical signal. When the optical transceiver module is at the normal operation state and the electronic signal receiving terminal does not receive any electronic signal over a first predetermined time period, the optical transceiver module enters a idle detection state, such that the electronic signal transmitting terminal performs a receiver termination detection to the device to determine whether the device is coupled to the optical transceiver module. When the optical transceiver module is at the idle detection state, the optical signal transmitting terminal transmits the optical signal continuously.

An exemplary embodiment of an optical transmission device is provided. The optical transmission device is coupled between a host and a device. The optical transmission device comprises a first optical fiber, a second optical fiber, a host-end optical transceiver module, and a device-end optical transceiver module. The host-end optical transceiver module comprises a host-end electronic signal transmitting terminal coupled to a receiving terminal of the host, a host-end electronic signal receiving terminal coupled to a transmitting terminal of the host, a host-end optical signal transmitting terminal coupled between a first terminal of the first optical fiber and the host-end electronic signal receiving terminal, and a host-end optical signal receiving terminal coupled between a third terminal of the second optical fiber and the host-end electronic signal transmitting terminal. The device-end optical transceiver module comprises a device-end electronic signal transmitting terminal coupled to a receiving terminal of the device, a device-end electronic signal receiving terminal coupled to a transmitting terminal of the device, a device-end optical signal receiving terminal coupled between a second terminal of the first optical fiber and the device-end electronic signal transmitting terminal, and a device-end optical signal transmitting terminal coupled between a fourth terminal of the second optical fiber and the device-end electronic signal receiving terminal. When the device-end optical transceiver module is at a normal operation state, the device-end optical signal transmitting terminal transmits an optical signal to the host-end optical signal receiving through the second optical fiber. When the device-end optical transceiver module is at the normal operation state and the device-end electronic signal receiving terminal does not receive any electronic signal over a first predetermined time period, the device-end optical transceiver module enters a idle detection state, such that the device-end electronic signal transmitting terminal performs a receiver termination detection to the device to determine whether the device is coupled to the device-end optical transceiver module. When the device-end optical transceiver module is at the idle detection state, the device-end optical signal transmitting terminal transmits the optical signal continuously.

An exemplary embodiment of an optical transmission method for an optical transmission device is provided. The optical transmission device is coupled between a host and a device. The optical transmission device comprises a first optical fiber, a second optical fiber, a host-end optical transceiver module, and a device-end optical transceiver module, the host-end optical transceiver module comprises a host-end electronic signal transmitting terminal coupled to a receiving terminal of the host, a host-end electronic signal receiving terminal coupled to a transmitting terminal of the host, a host-end optical signal transmitting terminal coupled between a first terminal of the first optical fiber and the host-end electronic signal receiving terminal, and a host-end optical signal receiving terminal coupled between a third terminal of the second optical fiber and the host-end electronic signal transmitting terminal. The device-end optical transceiver module comprises a device-end electronic signal transmitting terminal coupled to a receiving terminal of the device, a device-end electronic signal receiving terminal coupled to a transmitting terminal of the device, a device-end optical signal receiving terminal coupled between a second terminal of the first optical fiber and the device-end electronic signal transmitting terminal, and a device-end optical signal transmitting terminal coupled between a fourth terminal of the second optical fiber and the device-end electronic signal receiving terminal. The optical transmission method comprises steps of when the device-end optical transceiver module is at a normal operation state, the device-end optical signal transmitting terminal transmitting an optical signal to the host-end optical signal receiving through the second optical fiber, and when the device-end optical transceiver module is at the normal operation state and the device-end electronic signal receiving terminal does not receive any electronic signal over a first predetermined time period, the device-end optical transceiver module entering a idle detection state to make the device-end electronic signal transmitting terminal to perform a receiver termination detection to the device to determine whether the device is coupled to the device-end optical transceiver module. When the device-end optical transceiver module is at the idle detection state, the device-end optical signal transmitting terminal transmits the optical signal continuously.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
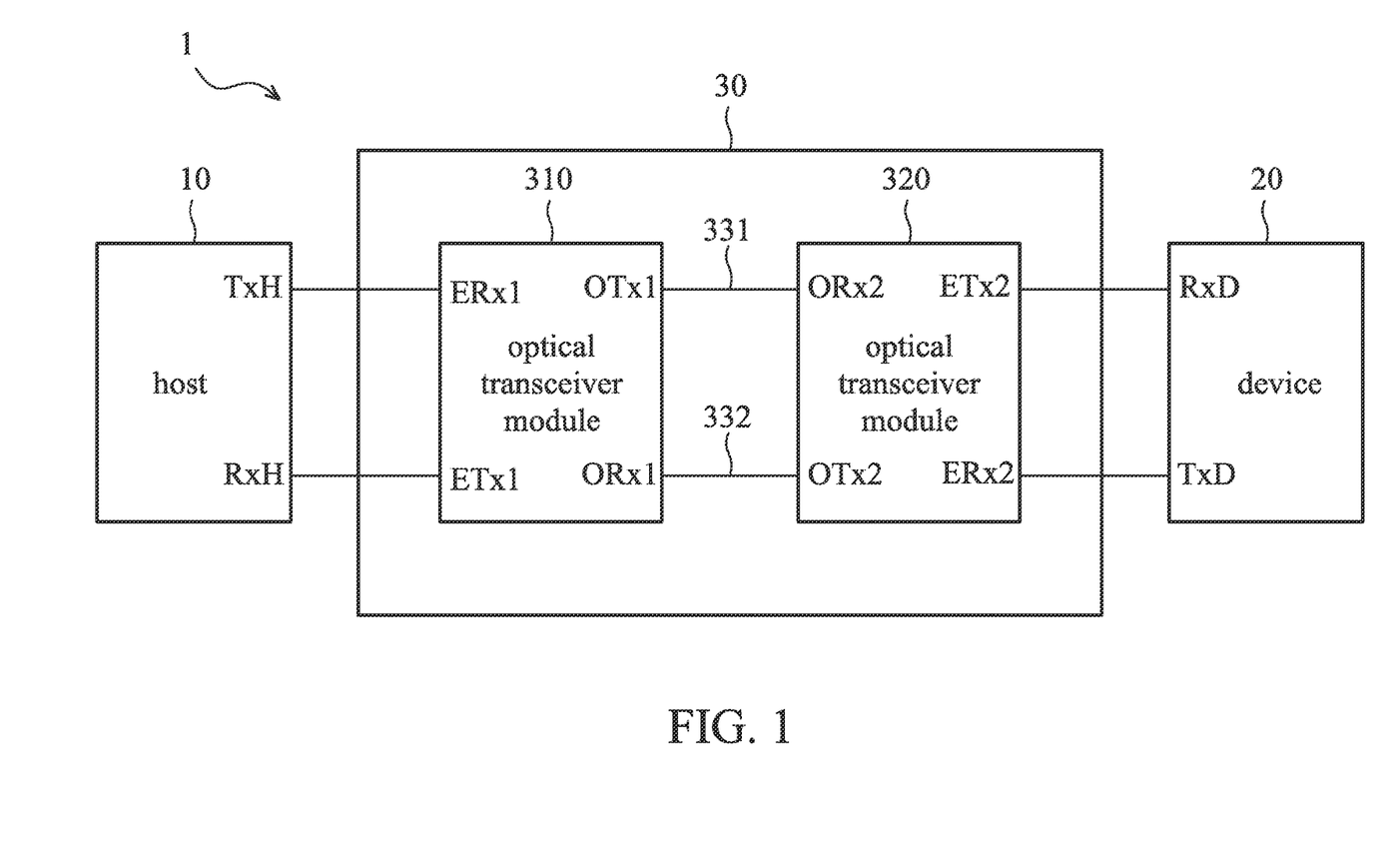
FIG. 1 shows an exemplary embodiment of an optical transmission system.

FIG. 1 shows an exemplary embodiment of an optical transmission system 1. The optical transceiver system 1 comprises a host 10, a device 20, and an optical transmission device 30 coupled between the host 10 and the device 20. The host 10 can be implemented by a high-speed electronic transceiver device which adopts a peripheral component interconnect express (PCIE) interface specification or an universal serial bus (USB) 3.0 or advanced version interface specification and supports hot plug functions. Further, the host 10 comprises a transmitting terminal TxH and a receiving terminal RxH. The device 20 can be implemented by a high-speed link device which adopts a PCIE interface specification or an USB 3.0 or advanced version interface specification and supports hot plug functions. Further, the device 20 comprises a transmitting terminal TxD and a receiving terminal RxD. In the following, the host 10 and the device 20 which adopt an USB 3.0 or advanced version interface specification are given as an example for illustrating embodiments.

The optical transmission device 30 comprises an optical transceiver module 310 coupled to the host 10, an optical transceiver module 320 coupled to the device 20, and optical fibers 331 and 332. The optical fibers 331 and 332 are coupled between the optical transceiver modules 310 and 320. The optical transceiver 310 comprises an electronic signal transmitting terminal ETx1, an electronic signal receiving terminal ERx1, an optical signal transmitting terminal OTx1, and an optical receiving terminal ORx1. The optical transceiver 320 comprises an electronic signal transmitting terminal ETx2, an electronic signal receiving terminal ERx2, an optical signal transmitting terminal OTx2, and an optical signal receiving terminal ORx2. The electronic signal receiving terminal ERx1 is coupled to the transmitting terminal TxH of the host 10 through a cable to receive an electronic signal transmitted from the host 10. The optical signal transmitting terminal OTx1 is coupled to the optical signal receiving terminal ORx2 of the optical transceiver module 320 through the optical fiber 331. The optical signal transmitting terminal OTx1 transmits an optical signal, which is transformed from the electronic signal received by the electronic signal receiving terminal ERx1 in the electronic-to-optical transformation manner, to the optical signal receiving terminal ORx2 through the optical fiber 331. The electronic signal transmitting terminal ETx2 is coupled to the receiving terminal RxD of the device 20 through a cable and transmits the optical signal, which is received by the optical signal receiving terminal ORx2 and obtained in electronic-to-optical transformation manner, to the receiving terminal RxD through the cable. The electronic signal receiving terminal ERx2 is coupled to the transmitting terminal TxD of the device 20 through a cable to receive an electronic signal transmitted from the device 20. The optical signal transmitting terminal OTx2 is coupled to the optical signal receiving terminal ORx1 of the optical transceiver module 310 through the optical fiber 332.

The optical signal transmitting terminal OTx2 transmits an optical signal, which is transformed from the electronic signal received by the electronic signal receiving terminal ERx2 in the electronic-to-optical transformation manner, to the optical signal receiving terminal O1x2 through the optical fiber 332. The electronic signal transmitting terminal ETx1 is coupled to the receiving terminal RxH of the host 10 through a cable and transmits the optical signal, which is received by the optical signal receiving terminal ORx1 and obtained in electronic-to-optical transformation manner, to the receiving terminal RxH through the cable.

Figure 2:
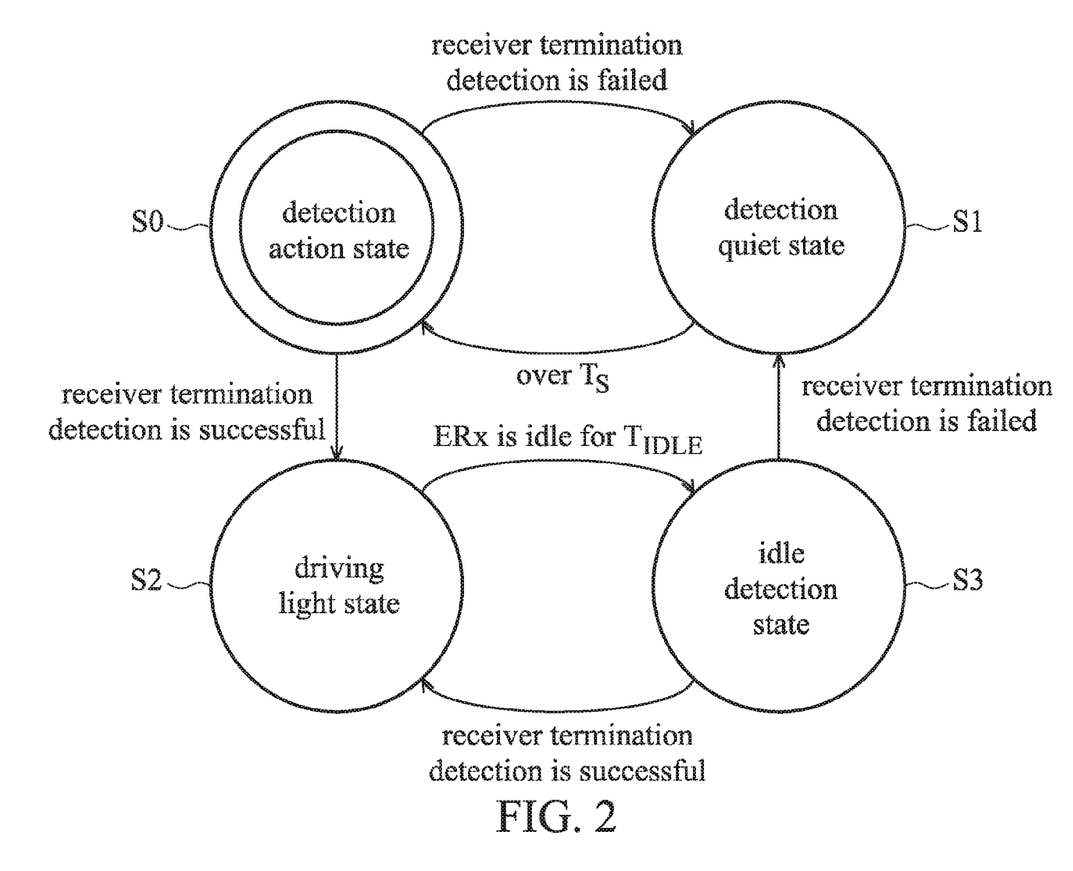
FIG. 2 is a schematic view showing state machine of a device-end optical transceiver module according to an exemplary embodiment.

FIG. 2 is a schematic view showing state machine of a device-end optical transceiver module (that is the optical transceiver module 320) according to an exemplary embodiment. The state machine of the optical transceiver module 320 comprises four states S0, S1, S2, and S3. Generally, the optical transceiver module 320 is self-powered device, such as being powered by an external adaptor. When the optical transceiver module 320 is powered on, the state machine of the optical transceiver 320 is pre-set in the detection active state S0. In the detection active state S0, the electronic signal transmitting terminal ETx2 of the optical transceiver module 320 performs device-end receiver termination detection to detect whether the device 20 is coupled to the optical transceiver module 320. Moreover, in the detection active state S0, the optical signal transmitting terminal OTx2 of the optical transceiver module 320 does not drive any optical signal, that is, does not transmit any optical signal. In the embodiment, the above device-end receiver termination detection is performed by periodically polling whether an electronic device (such as the above device 20) is inserted. In an embodiment, when a load is detected, the electronic signal transmitting terminal ETx2 determines that the device 20 is coupled to the optical transceiver module 320. In one embodiment, the above load can be a receiving termination impedance of the receiving terminal RxD (such as the impedance RRX-DC defined by Table 6-13 in USB 3.0 Specification with 1.0 revised version). When the electronic signal transmitting terminal ETx2 does not detect the receiving termination impedance of the receiving terminal RxD of the device 20 through the device-end receiver termination detection, it is determined that the device 20 is not coupled to the optical transceiver module 320. At this time, the optical transceiver module 320 enters the detection quiet state S1. On the other hand, when the electronic signal receiving terminal ETx2 detects the receiving termination impedance of that the receiving terminal RxD of the device 20 through the device-end receiver termination detection, it is determined that the device 20 is coupled to the optical transceiver module 320. At this time, the optical transceiver module 320 enters the driving light state S2.

At the detection quiet state S1, the electronic signal transmitting terminal ETx2 of the optical transceiver module 320 stops performing the device-end receiver termination detection, and the optical transmitting terminal OTx2 does not drive or transmit any optical signal. Once the optical transceiver module 320 enters the detection quiet state S1, a timer is activated. After the optical transceiver module 320 enters the detection quiet state S1 for a predetermined time period Ts (such as 12 ms), the optical transceiver module 320 returns to the detection active state S0.

The driving light state S2 is equivalent to a normal operation state. At the normal operation state, the optical transceiver 320 is capable of receiving and transmitting the signals between the device 20 and the optical transceiver 320 normally. At the driving light state S2, the electronic signal receiving terminal ERx2 is capable of receiving the electronic signal of the transmitting terminal TxD, and the optical signal transmitting terminal OTx2 is capable of transmitting the optical signal, which is transformed from the received electronic signal received in the electronic-to-optical transformation manner, to the optical signal receiving terminal ORx2 of the optical transceiver module 310 through the optical fiber 332. Moreover, in the driving light state S2, the optical signal receiving terminal ORx2 is capable of receiving the optical signal from the optical signal transmitting terminal OTx1 through the optical fiber 331, and the electronic signal transmitting terminal ETx2 transmits the electronic signal, which is transformed from the optical signal received by the optical signal receiving terminal ORx2 in the electronic-to-optical transformation manner, to the receiving terminal RxD of the device 20. Particularly, at the driving light state S2, the electronic signal receiving terminal ERx2 monitors the receiving situation of the electronic signal from the device 20. If the electronic signal receiving terminal ERx2 does not receive any electronic signal over idling time $T_{IDLE}$ (such as 300 ms, 400 ms, or 500 ms), the optical transceiver 320 enters the idle detection state S3.

At the idle detection state S3, the electronic signal transmitting terminal ETx2 performs the above device-end receiver termination detection to determine whether the device 20 is coupled to the optical transceiver module 320. Note that, even if the electronic signal receiving terminal ERx2 does not receive any electron signal from the transmitting terminal of the device 20 at the idle detection state S3, the optical signal transmitting terminal OTx2 still transmits the optical signal continuously. When it is determines that the device 20 is not coupled to the optical transceiver module 32 through the device-end receiver termination detection is performed (meaning that the device-end receiver termination detection is failed), that is also means that the device 20 is detached from the optical transceiver 320, the optical transceiver 320 enters the detection quiet state S1. On the other hand, when it is determines that the device 20 is coupled to the optical transceiver module 32 through the device-end receiver termination detection is performed (meaning that the device-end receiver termination detection is successful), that is also means that the device 20 is still coupled to the optical transceiver 320, the optical transceiver 320 returns to the driving light state S2.

According to the above description, for the states of the optical transceiver module 320, when the optical transceiver module 320 operates at the driving light state S2 or the idle detection state S3, the optical signal transmitting terminal OTx2 is capable of transmitting optical signals. When the optical transceiver module 320 operates the detection active state S0 or the detection quiet state S1, the optical signal transmitting terminal OTx2 does not transmit any optical signal. Moreover, when the optical transceiver module 320 is powered on from a power off state, the optical transceiver module 320 is pre-set to be at the detection active state S0 and then performs the device-end receiver termination detection to determine whether the device 20 is coupled to the optical transceiver module 320. When the device-end receiver termination detection determines that the device 320 is coupled to the optical transceiver module 320, the optical transceiver module 320 enters the driving light state S2. Otherwise, the optical transceiver module 320 is switches between the detection active state S0 and the detection quiet state S1. As described above, when the optical transceiver module 320 is at the driving light state S2, the optical transceiver module 320 may transmit optical signals. When the optical transceiver module 320 is at the detection active state S0 or the detection quiet state S1, the optical transceiver module 320 does not transmit any optical signal. That is, when the optical transceiver module 320 is powered on, the optical transceiver module 320 is not predetermined to operate at the state transmitting optical signals. Then, only when it is determined that the device 20 is coupled to the optical transceiver module 320, the optical transceiver module 320 is capable of transmitting optical signals for notifying the host 10 that the device 20 has been coupled to the optical transceiver module 320 through the optical transceiver module 320, so that the host 10 then builds a link connection procedure. Accordingly, the optical transceiver module 320 of the embodiments of the invention can solve one problem of the current techniques. Moreover, when the device 20 is detached from the optical transmission device 30 for a time period (such as the above idling time TIDLE), the optical transceiver module 320 enters the idle detection state S3 from the optical driving state S2 and then performs the device-end receiver termination detection to determine whether the device 20 is coupled to the optical transceiver module 320. When it is determined that the device 20 is coupled to the optical transceiver module 320, the optical transceiver module 320 returns to the driving light state S2; otherwise, the optical transceiver module 320 enter the detection quiet state S1. When the optical transceiver enters the detection quiet state S1, the optical transceiver module 320 does not transmit any optical signal, such that the optical transceiver module 320 is aware of the information about that the device 20 has be detached from the optical transmission device 30. Accordingly, the hot plugging function of the optical transceiver module 320 is achieved.

Figure 3:
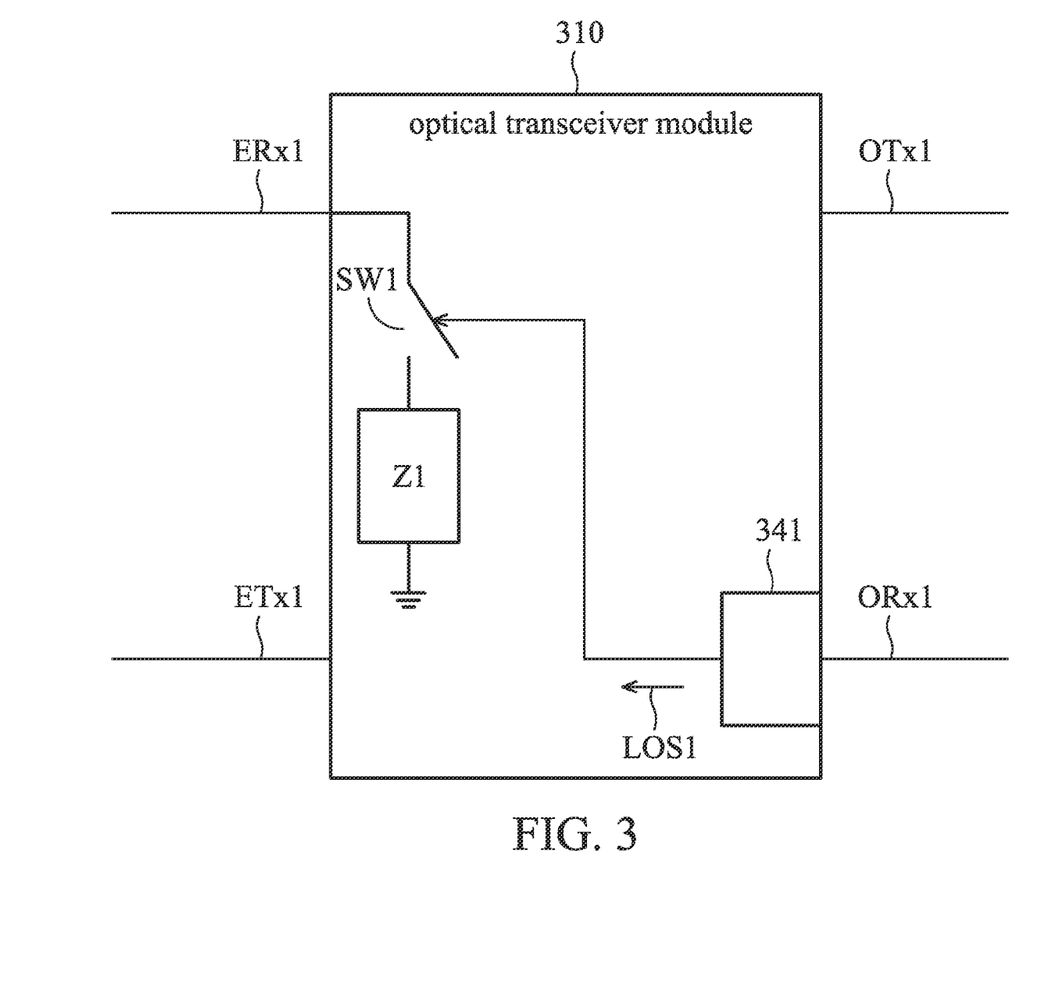
FIG. 3 shows an exemplary embodiment of a host-end optical transceiver module.

In the following, the hot plugging function of the optical transceiver module 310 will be described. FIG. 3 is an exemplary embodiment of the optical transceiver module 310. The optical transceiver module 310 comprises an optical signal detection unit 341, a switch SW1, and an impedance Z1. The impedance Z1 is coupled between the switch SW1 and a ground terminal. The switch SW1 is coupled between the impedance Z1 and the electronic signal receiving terminal ERx1. When the optical receiving terminal ORx1 of the optical transceiver module 310 receives an optical signal transmitted from the optical signal transmitting terminal OTx2 through the optical fiber 332, an optical signal receiving terminal detection signal LOS1, which is outputted from the optical signal detection unit 341 coupled to the optical receiving terminal ORx1 in the optical transceiver module 310, is used to turn on the switch SW1, such that the electronic signal receiving terminal ERx1 of the optical transceiver module 310 is coupled to the impedance Z1. Accordingly, the impedance Z1 is detected when the transmitting terminal TxH of the host 10 performs the device-end receiver termination detection, and the host is aware of that the device 20 has been coupled to the optical transmission device 30 according to the detection of the impedance Z1. On the other hand, when the optical signal receiving terminal ORx1 does not receive any optical signal, the optical signal receiving terminal detection signal LOS1, which is outputted from the optical signal detection unit 341 coupled to the optical receiving terminal ORx1 in the optical transceiver module 310, is used to turn off the switch SW1, such that the electronic signal receiving terminal ERx1 of the optical transceiver module 310 is not coupled to the impedance Z1. Accordingly, the impedance Z1 is not detected when the transmitting terminal TxH of the host 10 performs the device-end receiver termination detection, and the host 10 is aware of that the device 20 has been detached from the optical transmission device 30 according to the detection of the impedance Z1. According to the above embodiments, the hot plugging function of the optical transceiver module 310 coupled to the optical transmission device 30 is achieved.

The description referring to the idle time period $T_{IDLE}$ will be shown in the following. According to the specification of USB 3.0, four operation link states U0, U1, U2, and U3 are defined. The state U0 is an active ultra-speed link state. At the state U0, the device is capable of transmitting signals periodically. The states U1, U2, and U3 are power saving states. At the state U1, the device has to transmit signals every a predetermined time (such as 300 ms). At the states U2 and U3, the device does not transmit any signal. Thus, the idle time period $T_{IDLE}$ can be defined according to the operation behavior of the states U0, U1, U2, and U3. For example, at the state U1, the device has to transmit signals to the host every 300 ms. Thus, the idle time period $T_{IDLE}$ can be defined 300 ms, 400 ms, or 500 ms which is not less than 300 ms. When the electrode signal receiving terminal ERx2 does not receive any electronic signal over the idle time period $T_{IDLE}$, the optical transceiver module 320 enters the idle detection state S3. At the idle detection state S3, the electronic signal transmitting terminal ETx2 performs the device-end receiver termination detection, such that the device-end receiver termination detection is performed at the idle detection state S3 rather than at the optical driving state S2, which may prevent the transmission path from being interrupted by the device-end receiver termination. Particularly note that, the specification of USB 3.0 defines different operation modes at the states U0, U1, U2, and U3 (such as transmitting signals periodically or not transmitting signals). Thus, the embodiments defines the above states (shown in FIG. 2) of the state machine of the device-end optical transceiver module, such that the optical transmission device can conform to the requirement of the specification of USB 3.0 and the optical transmission device can support the hot-plugging function.

The host-end optical transceiver module, that is the optical transceiver module 310, is generally powered by the host 10. When the optical transceiver module 310 is powered by the host 10, the electronic signal transmitting terminal ETx1 of the optical transceiver module 310 performs host-end receiver termination detection to determine whether the host 10 is coupled to the optical transceiver module 310. In the embodiment, since the optical transceiver module 310 is powered by the host 10, losing the power supply of the optical transceiver module 310 represents that the host 10 is detached from the optical transmission device 30. Thus, the electronic signal transmitting terminal ETx1 performs the host-end receiver termination detection one time only when the optical transceiver module 310 is powered on. Similar to the optical transceiver module 320, when the host-end receiver termination detection is successful, the optical transceiver module 310 enters a normal operation state, and the optical signal transmitting terminal OTx1 transmits the optical signal, which is transformed from the electronic signal received by the electronic signal receiving terminal ERx1 in the electronic-to-optical transformation manner, to the optical signal receiving terminal ORx2 through the optical fiber 331. Moreover, at the normal operation state, the electronic signal transmitting terminal ETx1 transmits the electronic signal, which is transformed from the optical signal received by the optical signal receiving terminal ORx1 in the electronic-to-optical transformation manner, to the receiving terminal RxH of the host 10 through the optical fiber.

Note that, for the device 20, the device 20 can be powered by an external power suppler or/and an USB power terminal of an USB connector. The device powered by an external power suppler is referred to as a self-powered device. The device powered by an USB power terminal of an USB connector is referred to as a Vbus power device. In an embodiment, the self-powered device is required to enters a powered state only after the self-powered device is coupled to the optical transmission device and powered by the Vusb power VBUS provided by the optical transceiver module 320. According to a schematic view showing the optical transceiver module 320 in FIG. 4, the optical transceiver module 320 further comprises an optical signal detection unit 342 coupled to the optical signal receiving terminal ORx2, an impedance Z2, and switches SW21 and SW22. The impedance Z2 is coupled between the switch SW21 and a ground terminal. The switch SW21 is coupled between the impedance Z2 and the electronic signal receiving ERx2 and controlled by an optical signal receiving terminal detection signal LOS2 outputted from the optical signal detection unit 342. The switch SW22 is coupled between an external Vbus power VBUS and a power terminal Vbus2 of an USB connector of the optical transceiver module 320. The power terminal Vbus2 of an USB connector of the optical transceiver module 320 is further coupled to a power terminal VbusD of the device through the optical fiber.

Figure 4:
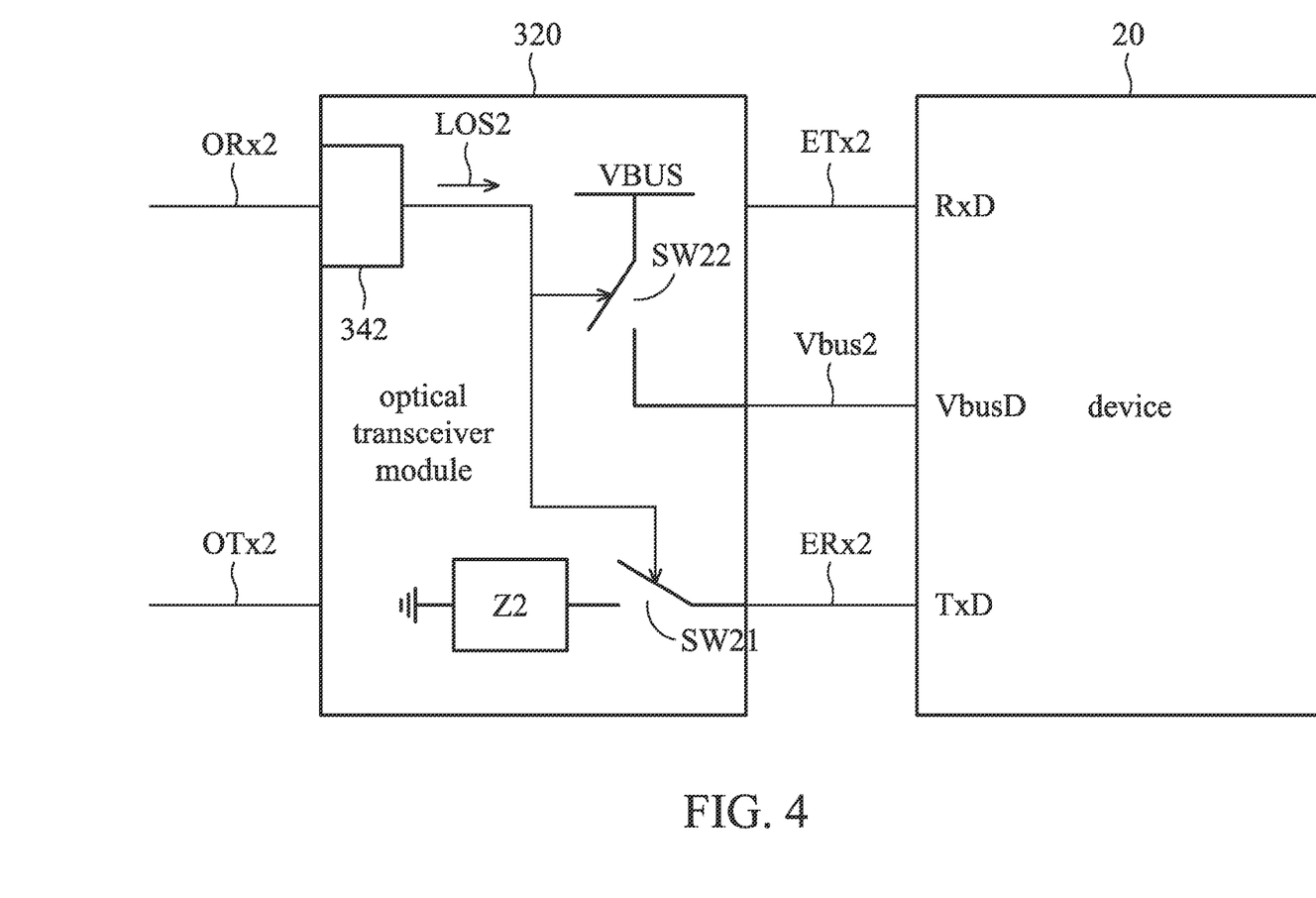
FIG. 4 shows an exemplary embodiment of a device-end optical transceiver module.

When the optical signal receiving terminal ORx2 of the optical transceiver module 320 receives the optical signal transmitted by the optical signal transmitting terminal OTx1 through the optical fiber 331, the optical signal receiving terminal detection signal LOS2 outputted from the optical signal detection unit 342 turns on the switches SW21 and SW22, such that the electronic signal receiving terminal ERx2 is coupled to the impedance Z2, and the external Vbus power VBUS is capable powering the device 20. On the other hand, when the optical signal receiving terminal ORx2 does not receive any optical signal, the optical signal receiving terminal detection signal LOS2 outputted from the optical signal detection unit 342 turns off the switches SW21 and SW22, such that the electronic signal receiving terminal ERx2 is not coupled to the impedance Z2, and the external Vbus power VBUS cannot power the device 20.

As described above, when the device is waked up, the transmitting terminal TxD may perform the receiver termination detection to be aware of whether the host 10 is coupled to the optical transmission device 30 according to whether the impedance Z2 is present. In other situations when the device 20 does not perform the receiver termination detection actively, the device 20 is also aware of whether the host 10 is coupled to the optical transmission device 30 according to whether the Vbus power is applied to the device. Accordingly, the device 20 is aware of whether the host 10 is coupled to the optical transmission device 30 in an all-round manner. According the above embodiments, the hot-plugging function of the host 10 coupled to the optical transmission device 30 can be achieved.

An embodiment of an optical transmission method is applied to an optical transmission device coupled between a host and a device. The optical transmission device comprises a first optical fiber, a second optical fiber, a host-end optical transceiver module, and a device-end optical transceiver module. The host-end optical transceiver module comprises a host-end electronic signal transmitting terminal coupled to a receiving terminal of the host, a host-end electronic signal receiving terminal coupled to a transmitting terminal of the host, a host-end optical signal transmitting terminal coupled between a first terminal of the first optical fiber and the host-end electronic signal receiving terminal, and a host-end optical signal receiving terminal coupled between a third terminal of the second optical fiber and the host-end electronic signal transmitting terminal. The device-end optical transceiver module comprises a device-end electronic signal transmitting terminal coupled to a receiving terminal of the device, a device-end electronic signal receiving terminal coupled to a transmitting terminal of the device, a device-end optical signal receiving terminal coupled between a second terminal of the first optical fiber and the device-end electronic signal transmitting terminal, and a device-end optical signal transmitting terminal coupled between a fourth terminal of the second optical fiber and the device-end electronic signal receiving terminal. The optical transmission method comprises: when the device-end optical transceiver module is at a normal operation state, the device-end optical signal transmitting terminal transmitting an optical signal to the host-end optical signal receiving through the second optical fiber, and when the device-end optical transceiver module is at the normal operation state and the device-end electronic signal receiving terminal does not receive any electronic signal over a first predetermined time period, the device-end optical transceiver module entering a idle detection state to make the device-end electronic signal transmitting terminal to perform a receiver termination detection to the device to determine whether the device is coupled to the device-end optical transceiver module. When the device-end optical transceiver module is at the idle detection state, the device-end optical signal transmitting terminal transmits the optical signal continuously.

The optical transmission method further comprises: when the device-end receiver termination detection determines that the device is coupled to the device-end optical transceiver module, the device-end optical transceiver module returning to the normal operation state, and when the device-end receiver termination detection determines that the device is not coupled to the device-end optical transceiver module, the device-end optical transceiver module entering a detection quiet state. When the device-end optical transceiver module is at the detection quiet state, the device-end electronic signal receiving terminal stops performing the device-end receiver termination detection, and the device-end optical signal transmitting terminal stops transmitting the optical signal.

The optical transmission method further comprises: when the device-end optical transceiver module is powered on, the device-end optical transceiver module entering a detection active state, and when the device-end optical transceiver module is at the detection active state, the device-end electronic signal transmitting terminal performing the device-end receiver termination detection to determine whether the device is coupled to the device-end optical transceiver module. When the device-end optical transceiver module is at the detection active state, the device-end optical signal transmitting terminal does not the optical signal.

The optical transmission method further comprises: when the device-end optical transceiver module is at the detection active state and the device-end receiver termination detection determines that the device is coupled to the optical transceiver module, the device-end optical transceiver module entering the normal operation state, and when the device-end optical transceiver module is at the detection active state and the device-end receiver termination detection determines that the device is not coupled to the device-end optical transceiver module, the device-end optical transceiver module entering a detection quiet state.

The optical transmission method further comprises: when the device-end optical transceiver module enters the detection quiet state for a second predetermined time period, the device-end optical transceiver module returning to the detection active state.

The optical transmission method further comprises: when the device-end optical signal receiving terminal receives any one optical signal, coupling the device-end electronic signal receiving terminal to a first impedance of the device-end optical transceiver module, and when the device-end optical signal receiving terminal does not receive any optical signal, not coupling the device-end electronic signal receiving terminal to the first impedance of the device-end optical transceiver module, The optical transmission method further comprises: when the device-end optical signal receiving terminal receives any one optical signal, coupling the host-end optical signal receiving terminal to a second impedance of the host-end optical transceiver module, and when the device-end optical signal receiving terminal does not receive any optical signal, not coupling the host-end optical signal receiving terminal to the second impedance.

In the above optical transmission method, the interface of the host is an interface with USB 3.0 or version higher than USB 3.0. The device is a device with USB 3.0 or version higher than USB 3.0.

In the embodiments, the recited host and device support USB 3.0. However, one skilled in the art can understand that the optical transceiver modules, the optical transmission device, and the option transmission method can applied to hosts and devices with USB 3.1 or USB of 3-series version.

Methods and apparatus of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing an embodiment of the disclosure. When implemented on a general-purpose processor, the program code combines with the processor to provide a unique apparatus that operates analogously to specific logic circuits.

While the invention has been described by way of example and in terms of preferred embodiments, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements

What is claimed is:

1. An optical transceiver module comprising:
an electronic signal transmitting terminal coupled to a receiving terminal of a device when the device is coupled to the optical transceiver module;
an electronic signal receiving terminal coupled to a transmitting terminal of the device when the device is coupled to the optical transceiver module;
an optical signal receiving terminal coupled to the electronic signal transmitting terminal; and
an optical signal transmitting terminal coupled to the electronic signal receiving terminal,
wherein when the optical transceiver module is at a normal operation state, the optical signal transmitting terminal transmits an optical signal,
wherein when the optical transceiver module is at the normal operation state and the electronic signal receiving terminal does not receive any electronic signal over a first predetermined time period, the optical transceiver module enters a idle detection state, such that the electronic signal transmitting terminal performs a receiver termination detection to determine whether the device is coupled to the optical transceiver module, and
wherein when the optical transceiver module is at the idle detection state, the optical signal transmitting terminal transmits the optical signal continuously.

2. The optical transceiver module as claimed in claim 1, wherein when the receiver termination detection determines that the device is coupled to the optical transceiver module, the optical transceiver module returns to the normal operation state,
wherein when the receiver termination detection determines that the device is not coupled to the optical transceiver module, the optical transceiver module enters a detection quiet state, and
wherein when the optical transceiver module is at the detection quiet state, the electronic signal transmitting terminal stops performing the receiver termination detection, and the optical signal transmitting terminal stops transmitting the optical signal.

3. The optical transceiver module as claimed in claim 2, wherein when the optical transceiver module enters the detection quiet state for a second predetermined time period, the optical transceiver module enters a detection active state.

4. The optical transceiver module as claimed in claim 1, wherein when the optical transceiver module is powered on, the optical transceiver module enters a detection active state, such that the electronic signal transmitting terminal performs the receiver termination detection to determine whether the device is coupled to the optical transceiver module, and
wherein when the optical transceiver module is at the detection active state, the optical signal transmitting terminal does not transmit the optical signal.

5. The optical transceiver module as claimed in claim 4, wherein when the optical transceiver module is at the detection active state and the receiver termination detection determines that the device is coupled to the optical transceiver module, the optical transceiver module enters the normal operation state,
wherein when the optical transceiver module is at the detection active state and the receiver termination detection determines that the device is not coupled to the optical transceiver module, the optical transceiver module enters a detection quiet state, and
wherein when the optical transceiver module is at the detection quiet state, the optical signal transmitting terminal does not transmit the optical signal.

6. The optical transceiver module as claimed in claim 5, wherein when the optical transceiver module enters the detection quiet state for a second predetermined time period, the optical transceiver module returns to the detection active state.

7. The optical transceiver module as claimed in claim 1, further comprising:
a first switch coupled between an external power supplier and a Vbus power terminal of the device, wherein when the optical signal receiving terminal does not receive any optical signal, the first switch does not couple the external power supplier to the Vbus power terminal, and wherein when the optical signal receiving terminal receives any one optical signal, the first switch couples the external power supplier to the Vbus power terminal.

8. The optical transceiver module as claimed in claim 1, further comprising:
an impedance; and
a second switch coupled between the electronic signal receiving terminal and the impedance,
wherein when the optical signal receiving terminal receives any one optical signal, the second switch couples the electronic signal receiving terminal to the impedance, and
wherein when the optical signal receiving terminal does not receive any optical signal, the second switch does not couple the electronic signal receiving terminal to the impedance.

9. An optical transmission device comprising:
a first optical fiber;
a second optical fiber;
a host-end optical transceiver module comprising:
a host-end electronic signal transmitting terminal coupled to a receiving terminal of a host;
a host-end electronic signal receiving terminal coupled to a transmitting terminal of the host;
a host-end optical signal transmitting terminal coupled between a first terminal of the first optical fiber and the host-end electronic signal receiving terminal; and
a host-end optical signal receiving terminal coupled between a third terminal of the second optical fiber and the host-end electronic signal transmitting terminal; and
a device-end optical transceiver module comprising:
a device-end electronic signal transmitting terminal coupled to a receiving terminal of a device when the device is coupled to the device-end optical transceiver module;
a device-end electronic signal receiving terminal coupled to a transmitting terminal of the device when the device is coupled to the device-end optical transceiver module;
a device-end optical signal receiving terminal coupled between a second terminal of the first optical fiber and the device-end electronic signal transmitting terminal; and
a device-end optical signal transmitting terminal coupled between a fourth terminal of the second optical fiber and the device-end electronic signal receiving terminal,
wherein when the device-end optical transceiver module is at a normal operation state, the device-end optical signal transmitting terminal transmits an optical signal to the host-end optical signal receiving through the second optical fiber,
wherein when the device-end optical transceiver module is at the normal operation state and the device-end electronic signal receiving terminal does not receive any electronic signal over a first predetermined time period, the device-end optical transceiver module enters a idle detection state, such that the device-end electronic signal transmitting terminal performs a receiver termination detection to determine whether the device is coupled to the device-end optical transceiver module, and wherein when the device-end optical transceiver module is at the idle detection state, the device-end optical signal transmitting terminal transmits the optical signal continuously.

10. The optical transmission device as claimed in claim 9, wherein when the device-end receiver termination detection determines that the device is coupled to the device-end optical transceiver module, the device-end optical transceiver module returns to the normal operation state,
wherein when the device-end receiver termination detection determines that the device is not coupled to the device-end optical transceiver module, the device-end optical transceiver module enters a detection quiet state, and
wherein when the device-end optical transceiver module is at the detection quiet state, the device-end electronic signal receiving terminal stops performing the device-end receiver termination detection, and the device-end optical signal transmitting terminal stops transmitting the optical signal.

11. The optical transmission device as claimed in claim 10, wherein when the device-end optical transceiver module is powered on, the device-end optical transceiver module enters a detection active state, and
wherein when the device-end optical transceiver module is at the detection active state, the device-end electronic signal transmitting terminal performs the device-end receiver termination detection, and the device-end optical signal transmitting terminal does not transmit the optical signal.

12. The optical transmission device as claimed in claim 11, wherein when the device-end optical transceiver module enters the detection quiet state for a second predetermined time period, the device-end optical transceiver module enters the detection active state.

13. The optical transmission device as claimed in claim 9, wherein when the device-end optical transceiver module is powered on, the device-end optical transceiver module enters a detection active state, such that the device-end electronic signal receiving terminal performs the device-end receiver termination detection to determine whether the device is coupled to the device-end optical transceiver module, and
wherein when the device-end optical transceiver module is at the detection active state, the device-end optical signal transmitting terminal does not transmit the optical signal.

14. The optical transmission device as claimed in claim 13, wherein when the device-end optical transceiver module is at the detection active state and the device-end receiver termination detection determines that the device is coupled to the device-end optical transceiver module, the device-end optical transceiver module enters the normal operation state,
wherein when the device-end optical transceiver module is at the detection active state and the device-end receiver termination detection determines that the device is not coupled to the device-end optical transceiver module, the device-end optical transceiver module enters a detection quiet state, and
wherein when the device-end optical transceiver module is at the detection quiet state, the device-end optical signal transmitting terminal does not transmit the optical signal.

15. The optical transmission device as claimed in claim 14, wherein when the device-end optical transceiver module enters the detection quiet state for a second predetermined time period, the device-end optical transceiver module returns to the detection active state.

16. The optical transmission device as claimed in claim 9, wherein the device-end optical transceiver module further comprising:
- a first switch coupled between an external power supplier and a Vbus power terminal of the device,
- wherein when the device-end optical signal receiving terminal does not receive any optical signal, the first switch does not couple the external power supplier to the Vbus power terminal, and
- wherein when the device-end optical signal receiving terminal receives any one optical signal, the first switch couples the external power supplier to the Vbus power terminal.

17. The optical transmission device as claimed in claim 9, wherein the device-end optical transceiver module further comprising:
- an impedance; and
- a second switch coupled between the device-end electronic signal receiving terminal and the impedance,
- wherein when the device-end optical signal receiving terminal receives any one optical signal, the second switch couples the device-end electronic signal receiving terminal to the impedance, and
- wherein when the device-end optical signal receiving terminal does not receive any optical signal, the second switch does not couple the device-end electronic signal receiving terminal to the impedance.

18. An optical transmission method for an optical transmission device, wherein the optical transmission device comprises a first optical fiber, a second optical fiber, a host-end optical transceiver module, and a device-end optical transceiver module, the host-end optical transceiver module comprises a host-end electronic signal transmitting terminal coupled to a receiving terminal of a host, a host-end electronic signal receiving terminal coupled to a transmitting terminal of the host, a host-end optical signal transmitting terminal coupled between a first terminal of the first optical fiber and the host-end electronic signal receiving terminal, and a host-end optical signal receiving terminal coupled between a third terminal of the second optical fiber and the host-end electronic signal transmitting terminal, the device-end optical transceiver module comprises a device-end electronic signal transmitting terminal coupled to a receiving terminal of a device when the device is coupled to the device-end optical transceiver module, a device-end electronic signal receiving terminal coupled to a transmitting terminal of the device when the device is coupled to the device-end optical transceiver module, a device-end optical signal receiving terminal coupled between a second terminal of the first optical fiber and the device-end electronic signal transmitting terminal, and a device-end optical signal transmitting terminal coupled between a fourth terminal of the second optical fiber and the device-end electronic signal receiving terminal, and the optical transmission method comprises:
- when the device-end optical transceiver module is at a normal operation state, transmitting an optical signal to the host-end optical signal receiving through the second optical fiber by the device-end optical signal transmitting terminal, and
- when the device-end optical transceiver module is at the normal operation state and the device-end electronic signal receiving terminal does not receive any electronic signal over a first predetermined time period, the device-end optical transceiver module entering a idle detection state to make the device-end electronic signal transmitting terminal to perform a receiver termination detection to determine whether the device is coupled to the device-end optical transceiver module,
- wherein when the device-end optical transceiver module is at the idle detection state, the device-end optical signal transmitting terminal transmits the optical signal continuously.

19. The optical transmission method as claimed in claim 18, further comprising:
- when the device-end receiver termination detection determines that the device is coupled to the device-end optical transceiver module, the device-end optical transceiver module returning to the normal operation state, and
- when the device-end receiver termination detection determines that the device is not coupled to the device-end optical transceiver module, the device-end optical transceiver module entering a detection quiet state,
- wherein when the device-end optical transceiver module is at the detection quiet state, the device-end electronic signal receiving terminal stops performing the device-end receiver termination detection, and the device-end optical signal transmitting terminal stops transmitting the optical signal.

20. The optical transmission method as claimed in claim 18, further comprising:
- when the device-end optical transceiver module is powered on, the device-end optical transceiver module entering a detection active state, and
- wherein when the device-end optical transceiver module is at the detection active state, the device-end electronic signal transmitting terminal performing the device-end receiver termination detection to determine whether the device is coupled to the device-end optical transceiver module,
- wherein when the device-end optical transceiver module is at the detection quiet state, the device-end optical signal transmitting terminal does not transmit the optical signal.

21. The optical transmission method as claimed in claim 20, further comprising:
- when the device-end optical transceiver module is at the detection active state and the device-end receiver termination detection determines that the device is coupled to the device-end optical transceiver module, the device-end optical transceiver module entering the normal operation state, and
- when the device-end optical transceiver module is at the detection active state and the device-end receiver termination detection determines that the device is not coupled to the device-end optical transceiver module, the device-end optical transceiver module entering a detection quiet state.

22. The optical transmission method as claimed in claim 21, further comprising:
- when the device-end optical transceiver module enters the detection quiet state for a second predetermined time period, the device-end optical transceiver module returning to the detection active state.

* * * * *